(12) United States Patent
Oh et al.

(10) Patent No.: US 7,332,008 B2
(45) Date of Patent: Feb. 19, 2008

(54) CYCLONE DUST COLLECTING APPARATUS AND A VACUUM CLEANER HAVING THE SAME

(75) Inventors: Jang-keun Oh, Gwangju (KR); Jung-gyun Han, Busan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 458 days.

(21) Appl. No.: 10/959,683

(22) Filed: Oct. 6, 2004

(65) Prior Publication Data

US 2005/0229559 A1      Oct. 20, 2005

(30) Foreign Application Priority Data

Apr. 16, 2004    (KR) ................ 10-2004-0026132

(51) Int. Cl.
*B01D 45/12* (2006.01)
(52) U.S. Cl. ............... 55/396; 55/429; 55/433; 55/457; 55/DIG. 3; 15/353
(58) Field of Classification Search ........ 55/318, 55/396, 428, 429, 433, 457, DIG. 3; 15/350, 15/353
See application file for complete search history.

(56) References Cited

U.S. PATENT DOCUMENTS

| 1,612,815 | A | * | 1/1927 | Hawley ............... 55/429 |
| 1,923,498 | A |   | 8/1933 | Nallinger |
| 3,759,016 | A | * | 9/1973 | Smith ............... 55/452 |
| 4,311,494 | A |   | 1/1982 | Conner |
| 4,569,687 | A |   | 2/1986 | Feng |
| 5,350,432 | A |   | 9/1994 | Lee |

FOREIGN PATENT DOCUMENTS

| DE | 10124216 | 11/1986 |
| DE | 1282872 | 1/2002 |
| GB | 1111074 | 4/1968 |
| JP | 11-26236 | 6/1965 |
| KR | 19950004664 | 6/1995 |
| KR | 20000074149 | 5/2000 |
| KR | 20010001225 | 1/2001 |
| KR | 20010001210 | 5/2001 |
| WO | WO 00/49932 | 8/2000 |
| WO | WO 00/74548 | 12/2000 |

* cited by examiner

*Primary Examiner*—Robert Hopkins
(74) *Attorney, Agent, or Firm*—Ladas & Parry LLP

(57) ABSTRACT

A cyclone dust-collecting apparatus capable of separately collecting relatively large dust particles and small dust particles, and implementing compact size and light weight thereof comprises a suction air inlet, a first dust-collecting chamber for collecting relatively large dust particles from dust-laden air drawn in through the suction air inlet, a second dust-collecting chamber for collecting relatively small dust particles from the air passed through the first dust collecting chamber, a cyclone generation portion extending across the first and the second dust-collecting chambers to provide fluid communication therebetween, a dust separation assembly formed in the cyclone generation portion configured to collide with the dust drawn in through the suction air inlet and to form a cyclone air stream in the second dust-collecting chamber, and an air discharge pipe disposed in the cyclone generation portion spaced apart from the dust separation assembly.

9 Claims, 3 Drawing Sheets

CYCLONE DUST COLLECTING APPARATUS AND A VACUUM CLEANER HAVING THE SAME

CROSS-REFERENCE TO RELATED APPLICATIONS

This application claims the benefit of Korean Patent Application No. 2004-26132, filed Apr. 16, 2003, in the Korean Intellectual Property Office, the disclosure of which is incorporated herein by reference.

BACKGROUND OF THE INVENTION

1. Field of the Invention

The present invention relates generally to a cyclone dust collecting apparatus, and more particularly, to a cyclone dust collecting apparatus for a vacuum cleaner, having improved size, weight and initial suction efficiency characteristics.

2. Description of the Background Art

Vacuum cleaners employing a dust-collecting bag are troublesome due to the need for frequent replacement of the dust-collecting bag. Therefore, vacuum cleaners comprising a cyclone dust collecting apparatus have been introduced, since such devices are recyclable after collecting dust by use of centrifugal force followed by removing the collected dust.

However, cyclone-type vacuum cleaners take up a relatively large volume compared to conventional vacuum cleaners using a dust bag, and also increase the weight of the vacuum cleaner. Furthermore, cyclone type vacuum cleaners operated by circulating an air stream in a cyclone for generation of centrifugal force. Because the air stream is generated by the vacuum generating motor, loss of driving force of the motor inevitably ensues. Therefore, if one vacuum generating source is used for a driving force generator of the air stream in a cyclone dust collecting chamber and for generating the vacuum suction force for drawing the air into the vacuum cleaner at the same time, the initial suction force of the cyclone dust collecting apparatus is decreased compared to a dust collecting apparatus which uses a dust-collecting bag.

SUMMARY OF THE INVENTION

An aspect of the present invention is to solve at least the above problems and/or disadvantages and to provide at least the advantages described below. Accordingly, an aspect of the present invention is to provide an improved cyclone dust collecting apparatus capable of separately collecting both large and small dust particles, and being compact in size and light in weight.

In order to achieve the above-described aspects of the present invention, there is provided a suction inlet, a first dust-collecting chamber for collecting relatively large dust particles from dust-laden air drawn in through the suction air inlet, a second dust-collecting chamber for collecting relatively small dust particles from the air having passed through the first dust-collecting chamber, a cyclone generation portion formed to extend across the first and the second dust-collecting chambers to provide fluid communication therebetween, a dust separation assembly formed in the cyclone generation portion shaped and configured to collide with the dust drawn in through the suction air inlet and to form a cyclone air stream in the second dust-collecting chamber, and a discharge pipe disposed in the cyclone generation portion spaced apart from the dust separation assembly.

The cyclone generation portion is substantially defined in the configuration of a cylinder having a cyclone air inlet formed at one end and extending into the first dust-collecting chamber as that of a cyclone air outlet formed at the other end thereof and extending into the second dust-collecting chamber, the cyclone generating ends having essentially the same diameter.

The cyclone generation portion is disposed such that an end thereof extends into the first dust-collecting chamber to a longer distance than the opposite end thereof extending into the second dust-collecting chamber.

The dust separation assembly further comprises a first dust separator coaxially aligned with the suction air inlet, the cyclone generation portion and the air discharge pipe, respectively, and a second dust separator having two ends and being attached to the first dust separator at one end and to an inner periphery of the cyclone generation portion at the other end, shaped and configured to generate a cyclone air stream within the cyclone generation portion.

The first dust separator further comprises a projection protruding toward the suction air inlet generally having the shape of a cone, and an opening formed on the opposite side of the projection, the opening and having essentially the same diameter as the air discharge pipe.

The second dust separator is formed by a plurality of blades disposed radially with respect to the first dust separator.

The cyclone generation portion is spaced from a sidewall of the second dust-collecting chamber by a predetermined gap of approximately between 8 and 12 mm.

The first and the second dust-collecting chambers have an openable bottom defined by a hinged door member providing for easy removal of the dust collected therein.

According to another aspect of the present invention, there is a vacuum cleaner comprising a suction brush for drawing in dust entrained in an air stream from a surface being cleaned, a suction air inlet connected to the suction brush through a path forming member, a first dust-collecting chamber for collecting relatively large dust particles from the dust-laden air drawn in through the suction inlet, a second dust-collecting chamber for collecting relatively small dust particles from the air passed through the first dust collecting chamber, a cyclone generation portion formed to extend across the first and the second dust-collecting chambers to provide fluid communication therebetween, a dust separation assembly formed in the cyclone generation portion configured to collide with the dust drawn in through the suction air inlet and to generate a cyclone air stream in the second dust-collecting chamber, an air discharge pipe spaced apart from the dust separation assembly, and a driving part connected to the air discharge pipe to generate a vacuum suction force.

BRIEF DESCRIPTION OF THE DRAWING FIGURES

The above aspects and other features of the present invention will become more apparent by achieving an understanding of the detailed description of the exemplary embodiments thereof with reference to the attached drawing figures, wherein.

DETAILED DESCRIPTION OF THE PREFERRED EMBODIMENTS

Figure 1:
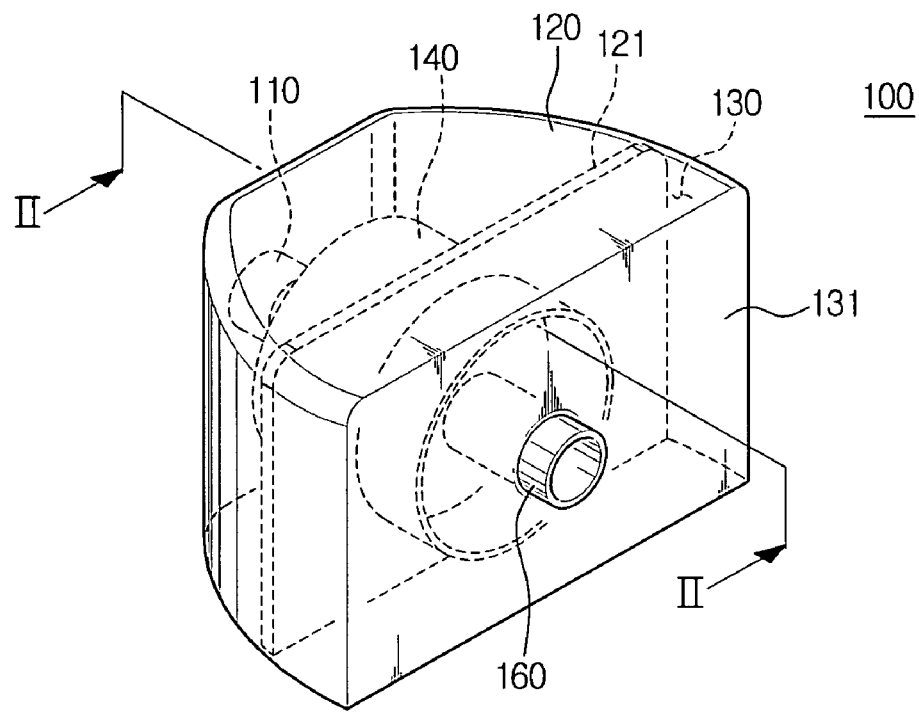
FIG. 1 is a perspective view of a cyclone dust collecting apparatus according to an embodiment of the present invention.

Hereinafter, an embodiment of the present invention will be described in detail with reference to the accompanying drawing figures.

In the following description, identical drawing reference numerals are used to indicate the same or similar elements even between the different drawings figures. The elements defined in the detailed description, such as the construction and function of the elements are only provided to assist in a comprehensive understanding of the invention. Thus, it is apparent that the teaching of the present invention can be carried out without specific use of some of those defined elements. Also, well-known functions or constructions are not described in detail to avoid obscuring the invention description in unnecessary detail.

FIG. 1 is a perspective view of a cyclone dust collecting apparatus 100 according to an embodiment of the present invention. As shown in FIG. 1, the cyclone dust collecting apparatus 100 comprises a suction air inlet 110 (shown in phantom), a first dust-collecting chamber 120, a second dust-collecting chamber 130, a cyclone generation portion 140 (shown in phantom), a dust separation assembly 150 (not shown in FIG. 1) and an air discharge pipe 160.

The suction air inlet 110 draws in dust-laden air from a surface being cleaned into the cyclone dust collecting apparatus 100. The first dust-collecting chamber 120 is connected to the dust inlet 110 and is used to separate and collect relatively large dust particles from the drawn-in air.

The second dust collecting chamber 130 is disposed downstream of the first dust collecting chamber 120, and is divided therefrom by a partition 121. The second dust-collecting chamber 130 is used to collect relatively small dust particles which are separated by a centrifugal force generated by a cyclone air stream generated in the cyclone generation portion 140.

Figure 2:
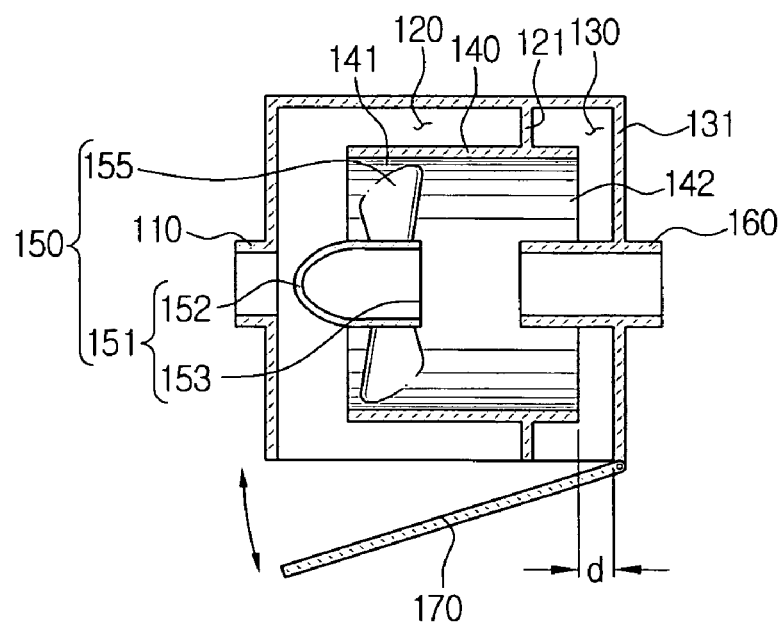
FIG. 2 is a cross-sectional view of the cyclone dust collecting apparatus shown in FIG. 1 taken approximately along a line II-II.
Figure 3:
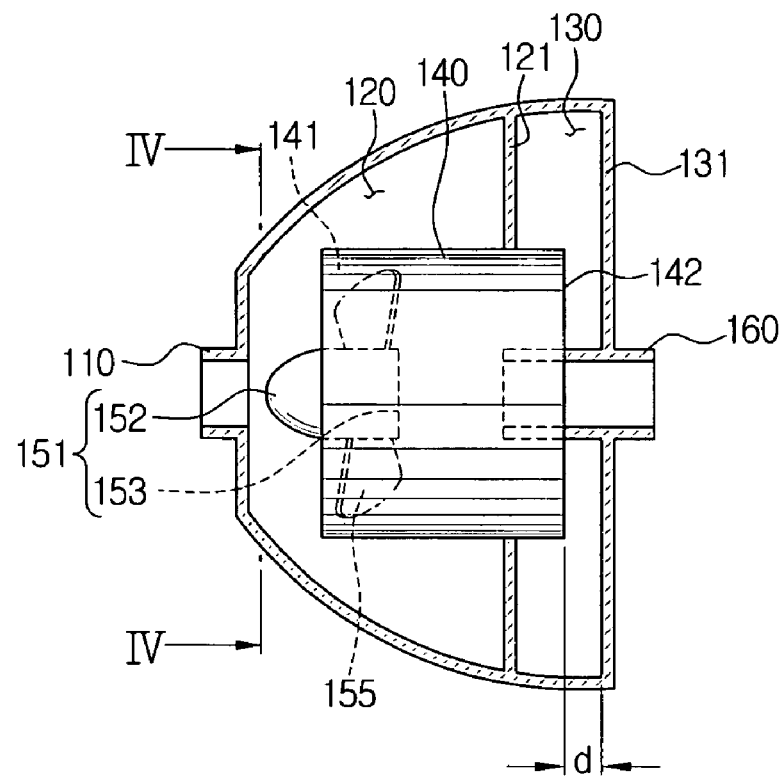
FIG. 3 is a plan view in partial cross-section of the invention shown in FIG. 1.
Figure 4:
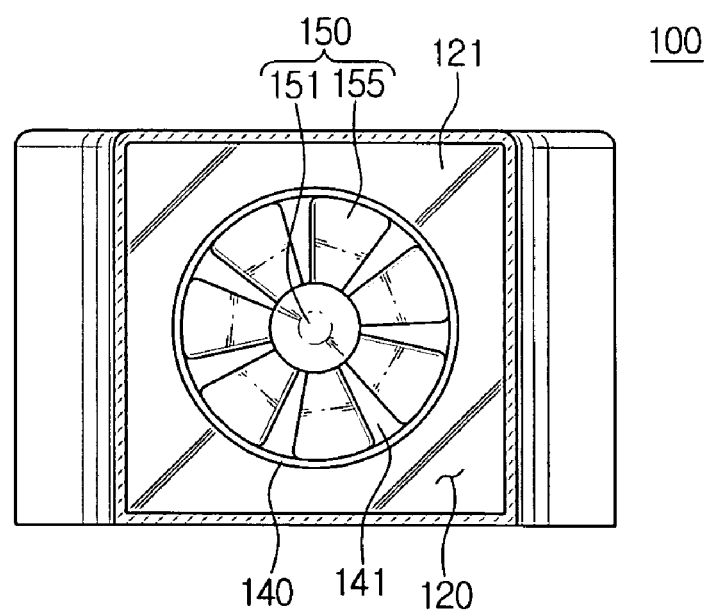
FIG. 4 is a cross-sectional view of the invention shown in FIG. 3 taken approximately along a line IV-IV thereof.

Referring now also to FIGS. 2-4, the cyclone generation portion 140 is formed to extend across the first and the second dust-collecting chambers 120 and 130 and to provide fluid communication therebetween. The cyclone generation portion 140 may be in the form of a cylinder, one end of which, a cyclone inlet 141, extends into the first dust-collecting chamber 120, and the other end, a cyclone outlet 142, extends into the second dust-collecting chamber 130. The cyclone inlet 141 and cyclone outlet 142, being provided as the two ends of a cylinder, preferably have the same diameter. The cyclone generation portion 140 overlaps and extends into the space defining the first and the second dust collecting chambers 120 and 130. The extension of the cyclone generating portion 140 into the first dust-collecting chamber 120 is preferably larger than the extension thereof into the second dust-collecting chamber 130, as shown in FIG. 2. The cyclone outlet 141 of cyclone generation portion 140 is spaced by a predetermined gap 'd' from a sidewall 131 of the second dust-collecting chamber 130 on which the air discharge pipe 160 is formed. The gap 'd' has a dimension preferably in a range of approximately from 8 to 12 mm to enable the relatively small dust particles to be collected in the second dust-collecting chamber 130, which particles are separated by the centrifugal force of the cyclone air stream generated by the dust separation part 150, as will be described below.

The dust separation assembly 150 is disposed in the cyclone generation portion 140 and is shaped and configured to collide with the dust particles drawn in through the suction inlet 110, thereby separating relatively large dust particles, and thereby to generate a cyclone air stream from the air drawn into the second dust-collecting chamber 130.

The dust separation assembly 150 comprises first and second dust separators 151 and 155, respectively, as shown in FIG. 2. The first dust separator 151 is coaxially aligned with the cyclone generation portion 140 and the air discharge pipe 160. The dust separator 151 comprises a projection 152, preferably having a conical shape, protruding from the cyclone inlet 141 toward the suction air inlet 110, and an opening 153 formed on the opposite side to the projection 152 and having approximately the same diameter as the air discharge pipe 160.

The second dust separator 155, comprising blades, is attached to the first dust separator 151 at one end of each blade, and extends toward an inner periphery of the cyclone generation portion 140 at the other end of each blade to generate a cyclone air stream in the cyclone generation portion 140. The second dust separator 155 is preferably defined by a plurality of blades disposed radially with respect to the first dust separator 151. The blades of the second dust separator 155 are preferably disposed at an angle relative to the direction of the air stream, so that the air passing through the second dust separator 155 is forced to generate a cyclone air stream by being deflected by the angled blades as it passes through the second dust separator 155. Although not shown in FIG. 2, the other end of the blades optionally may be attached to the inner periphery of the cyclone generating portion 140, as shown in FIG. 4.

The air discharge pipe 160 is connected to a driving force generator (not shown) which generates a suction force, and discharges cleaned air, after it has passed through the first and the second dust-collecting chambers 120 and 130, to the environment outside of the cyclone dust-collecting apparatus 100. The air discharge pipe 160 is disposed and extends into a space within the cyclone generation portion 140, but is spaced therefrom by a predetermined distance from the first dust separator 151.

Since the first and the second dust-collecting chambers 120 and 130 have an openable hinged bottom using a door member 170, as shown in FIG. 2, the dust collected therein can be easily removed by a user.

Figure 5:
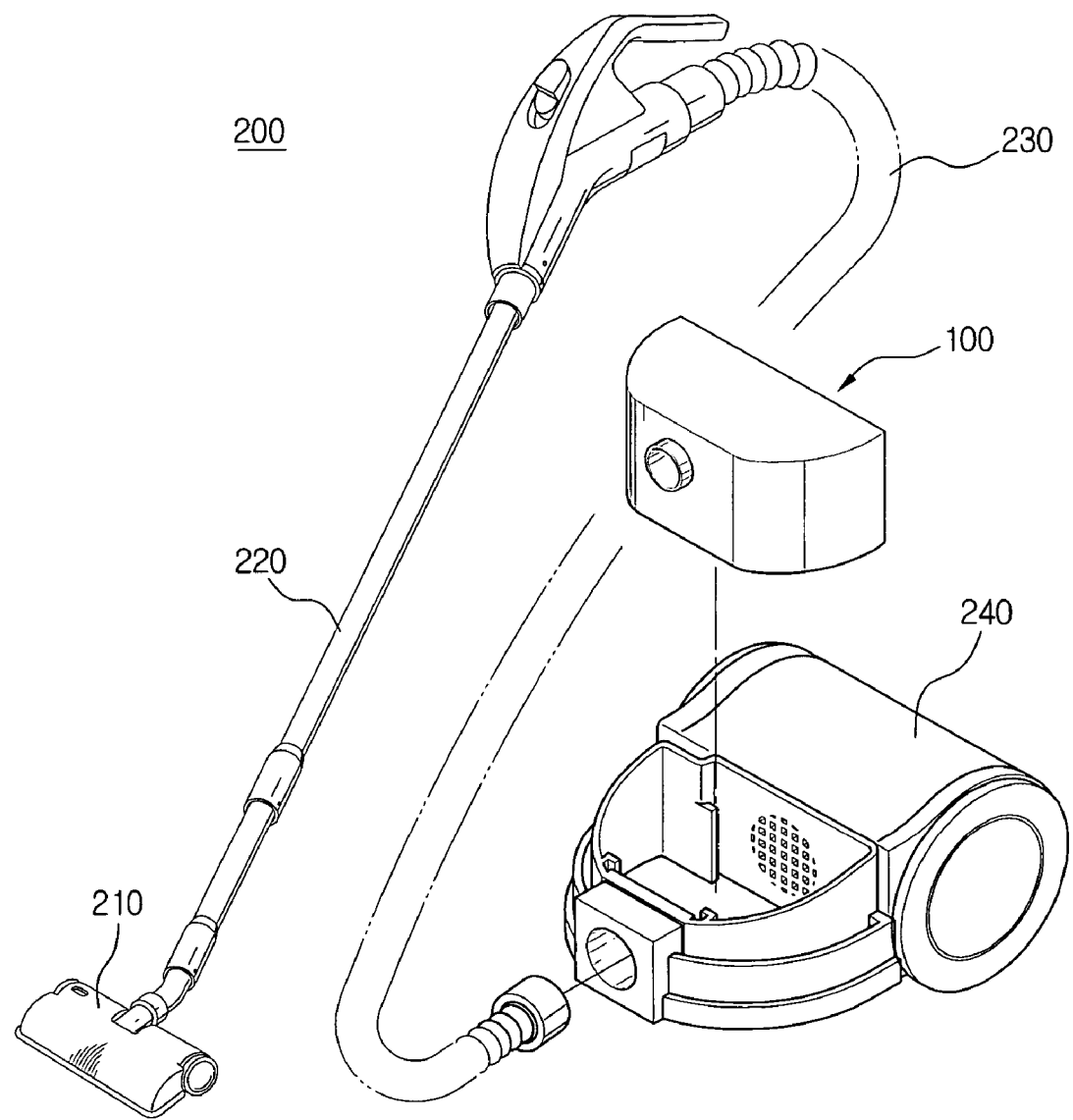
FIG. 5 is a perspective, partially-exploded view of a vacuum cleaner using the cyclone dust-collecting apparatus according to the present invention.

Referring now to FIG. 5, a vacuum cleaner 200 having the above-described cyclone dust collecting apparatus 100 according to an embodiment of the present invention comprises a suction nozzle 210, an extension pipe 220, a flexible hose 230, a cleaner body 240 and the cyclone dust-collecting apparatus 100 removably mounted in the cleaner body 240.

The suction nozzle 210 draws in the air and entrained dust from the surface being cleaned. The extension pipe 220 is connected to the flexible hose 230, which is itself further connected to the cleaner body 240, so as to collect the dust in the cyclone dust-collecting apparatus 100 mounted in the cleaner body 240.

Relatively large dust particles entrained in the dust-laden air are drawn in through the suction nozzle 210, and enter the first dust-collecting chamber 120. Upon reaching the dust separation assembly 150, the large dust particles collide with the first dust separator 151 and the second dust separator 155 formed by the blades, thereby arresting their forward motion, and being collected in the first dust-collecting chamber 120. The air passed through the second dust separator 155 is forced into a cyclone air stream by the second dust separator 155. Relatively small dust particles, which are not collected by the first dust separator 151, are separated from the cyclone air stream by centrifugal force, and thereby are collected in the second dust-collecting chamber 130 after having first passed through the gap 'd' shown in FIG. 2.

The air discharge pipe 160 is preferably disposed to extend within the cyclone generation portion 140. However, the extended end should not be in close proximity to the first dust separator 151, since suction efficiency depends in some part on the distance between the first dust separator 151 and the air discharging pipe 160.

The air passed through the air discharge pipe 160 is discharged to the outside of the cleaner body 240 and into a motor driving chamber (not shown) located in the cleaner body 240.

According to the cyclone dust-collecting apparatus 100 of the present invention used in the vacuum cleaner 200, dust can be separately collected according to its size, in a manner that relatively large dust particles are primarily collected in the first dust collecting chamber 120 by colliding with the first dust separator 151, and then relatively small dust particles are collected by the centrifugal force of the cyclone air stream generated by the second dust separator 155 and are collected in the second dust-collecting chamber 130.

Furthermore, since only the small dust particles, having first passed through the first dust-collecting chamber 120, are separated by centrifugal force, the driving force for forming the cyclone air stream in the cyclone generation portion 140 can retain its power. As a result, the whole size of the vacuum cleaner can be reduced with corresponding benefits, such as lighter weight.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cyclone dust-collecting apparatus comprising:
   a suction air inlet;
   a first dust-collecting chamber for collecting relatively large dust particles from dust-laden air drawn in through the suction air inlet;
   a second dust-collecting chamber for collecting relatively small dust particles from the air having passed through the first dust-collecting chamber;
   a cyclone generation portion is formed to extend across the first and the second dust collecting chambers to provide fluid communication there between,
   wherein the cyclone generation portion is substantially defined by a cylinder having a cyclone air inlet formed at one end and which extends into the first dust-collecting chamber, the cylinder having an air outlet at the other end thereof, said cylinder extending into the second dust-collecting chamber, the cyclone generating ends having essentially the same diameter;
   a dust separation assembly is formed in the cyclone generation portion shaped and configured to collide with the dust drawn in through the suction air inlet and to form a cyclone air stream in the second dust-collecting chamber; and
   a discharge pipe disposed in the cyclone generation portion spaced apart from the dust separation assembly.

2. The cyclone dust-collecting apparatus of claim 1, wherein the cyclone generation portion is disposed such that an end thereof extends into the first dust-collecting chamber to a longer distance than the opposite end thereof extending into the second dust-collecting chamber.

3. The cyclone-dust collecting apparatus of claim 1, wherein the dust separation assembly further comprises:
   a first dust separator coaxially aligned with the suction air inlet, the cyclone generation portion and the air discharge pipe, respectively; and
   a second dust separator having two ends and being attached to the first dust separator at one end and to an inner periphery of the cyclone generation portion at the other end, shaped and configured to generate a cyclone air stream within the cyclone generation portion.

4. The cyclone dust-collecting apparatus of claim 3, wherein the first dust separator comprises:
   a projection protruding toward the suction air inlet generally having the shape of a cone; and
   an opening formed on the opposite side of the projection, the opening having essentially the same diameter as the air discharge pipe.

5. The cyclone dust-collecting apparatus of claim 3, wherein the second dust separator comprises a plurality of blades disposed radially with respect to the first dust separator.

6. The cyclone dust-collecting apparatus of claim 1, wherein the cyclone generation portion is spaced from a sidewall of the second dust-collecting chamber, by a predetermined gap of approximately between 8 and 12 mm.

7. The cyclone dust-collecting apparatus of claim 1, wherein the cyclone generation portion is spaced from a sidewall of the second dust-collecting chamber by a predetermined gap of approximately between 8 and 12 mm.

8. The cyclone dust-collecting apparatus of claim 1, wherein the first and the second dust-collecting chambers have an openable bottom defined by a hinged door member providing for easy removal of the dust collected therein.

9. A vacuum cleaner comprising:
   a suction brush for drawing in dust entrained in an air stream from a surface being cleaned;
   a suction air inlet connected to the suction brush through a path forming member;
   a first dust-collecting chamber for collecting relatively large dust particles from the dust-laden air drawn in through the suction air inlet;
   a second dust-collecting chamber for collecting relatively small dust particles from the air passed through the first dust-collecting chamber;
   a cyclone generation portion formed to extend across the first and the second dust collecting chambers to provide fluid communication therebetween;
   a dust separation assembly formed in the cyclone generation portion configured to collide with the dust drawn in through the suction air inlet and to generate a cyclone air stream in the second dust-collecting chamber;
   an air discharge pipe spaced apart from the dust separation assembly; and
   a driving part connected to the air discharge pipe to generate a vacuum suction force.

* * * * *